Patented Aug. 16, 1938

2,127,453

UNITED STATES PATENT OFFICE 2,127,453

PROCESS TO PREVENT THE OILING OFF OR LEAKAGE OF BUTTERFAT IN CHEESE

Harry L. Wilson, Chevy Chase, Md., and William T. Johnson, Jr., Arlington, Va.; dedicated to the free use of the People of the United States of America No Drawing. Application July 3, 1937, Serial No. 151,914

3 Claims. (Cl. 99—116)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to us of any royalty thereon.

We hereby dedicate the invention herein described to the free use of the People of the United States of America to take effect on the granting of a patent to us.

Our invention is for a process which we have discovered for preventing the separation of fat from cheese that is held, intentionally or unintentionally, at a high temperature. Butterfat is the most expensive constituent in cheese. Normally thirty-two to thirty-four percent of whole milk American Cheddar cheese is butterfat. Fifty to fifty-four percent of the dry matter in Cheddar cheese is butterfat. When cheese is held at temperatures over 70° F., as it often is, in homes, stores, and in curing rooms, the butterfat softens and runs out of the cheese. Sufficient fat is sometimes lost to severely injure the quality of the cheese. The loss of fat is not only important from a quality standpoint, but it will also result in a lower yield per 100 pounds of milk. In some sections, where refrigeration is not provided or available, five percent, or even ten percent, of the fat may leak out of the cheese. When cheese is packed in cans, jars, or other types of packages and held at a temperature over 70° F. the leakage of fat not only injures the quality, but it makes a very unattractive package to handle with the butterfat lodged under the wrapper or in the bottom of the can or jar.

Our process, which prevents the leakage of fat and losses in weight, reduces the evaporation of moisture, and results in improved quality and more attractive package, includes homogenization and pasteurization of the cream only and may include pasteurization of approximately 90 percent of the skim milk.

It will cost less and requires less time to homogenize the cream than it would be to homogenize the whole milk. The main object, however, for homogenizing only the cream is that when the cream is homogenized and pasteurized and approximately 90 percent of the skim milk used for standardizing the cream is pasteurized, the mixed milk and cream will work normally during the cheese making process. There are no losses of fat or curd and there is no difficulty in gathering the curd or draining the whey.

If the whole milk is homogenized it is difficult to gather the curd and drain the whey. The loss of curd in the whey is so great that the process is not practical. We have also found that to homogenize the whole milk injuries both the flavor and the body of the cheese. It would also require at least ten times as much time to homogenize the whole milk as it does to homogenize the 40 percent cream from an equal quantity of milk.

The whole milk is run through a cream separator which is adjusted to produce cream having a high percentage of butterfat, preferably 40 percent. Cream having a higher or lower butterfat content, however, can be used.

The cream is heated to a temperature which will give the maximum emulsification of the fat in homogenization and homogenized at a pressure sufficiently high to insure emulsification of the fat. We have found, however, that a temperature of substantially 145° F. is safer and a pressure of 1,000 to 2,500 pounds per square inch is sufficient to produce the desired results. The homogenized cream flows from the homogenizer into a sufficient quantity of skim milk to reduce the butterfat content of the homogenized cream to about 30 percent. The skim milk is heated to about 145° F. before it is mixed with the homogenized cream. The purpose of holding the skim milk and homogenized cream mixture at about this temperature and reducing the butterfat content of the homogenized cream from 40 percent to 30 percent is to make it easier and more convenient to handle.

When the cream is homogenized and mixed with a small portion of skim milk, the mixture is at once heated to a temperature which will destroy the lypolytic enzymes of the milk (145° F. to 160° F., held 30 minutes and cooled to setting temperature, about 88° F.). The greatest objection to a higher holding temperature is that it may cause the cream to have a cooked flavor.

It is important, however, that the cream be heated to from 145° to 160° F. immediately after it is homogenized or to heat the cream to a temperature sufficiently high before homogenizing so that a temperature of at least 145° F. will be maintained for at least 30 minutes after the cream is homogenized. This must be done to destroy the lipase which otherwise will produce a bitter rancid disagreeable flavor and undesirable body in the cheese curd and in the cheese when it is cured.

Sufficient skim milk is then added to reduce the fat content to the percentage that will give the desired percentage of fat in the cheese. Ninety percent of the skim milk may be pasteurized by heating to 145° F. and holding 30 minutes or to 160° F. by the flash method.

For example, if 10,000 pounds of whole milk having a fat content of 3.8 percent is to be processed, proceed as follows:

In 10,000 pounds of milk containing 3.8 percent butterfat is 380 pounds of butterfat.

When skimmed there will be approximately 950 pounds of 40 percent cream. Only 950 pounds of the 10,000 pounds has to be heated to a temperature which will give the maximum emulsification of the fat in homogenization and homogenized at a pressure sufficiently high to insure emulsification of the fat.

The 950 pounds of homogenized cream containing 40 percent butterfat flows into a vat containing 317 pounds of skim milk that has been heated to 145° F. This makes a mixture of 1267 pounds of cream having a fat content of 30 percent. This mixture is heated to a temperature which will destroy the lypolytic enzymes of the milk (145° F. to 160 F., held 30 minutes and cooled to setting temperature, about 88° F.) To this mixture is added 7780 pounds of skim milk that has been pasteurized by heating to 145° F. and held 30 minutes or to 160° F. by the flash method. This makes a mixture of milk having a fat content of 4.2 percent. We then add 953 pounds of a good quality of raw skim milk, making a mixture of approximately 10,000 pounds of milk having a fat content of 3.8 percent and of which only the cream, or 950 pounds, has been homogenized, and of which approximately 10 percent of the skim milk added is raw of unpasteurized.

While the pasteurization of the skim milk is desirable it is not an essential part of our process, and the homogenized and pasteurized cream may be mixed or standardized with raw skim milk.

Having thus described our invention, what we claim for Letters Patent is:

We claim:

1. A new process for preventing the oiling off or leakage of butterfat in cheese, which comprises the combination of separating milk, heating the resulting cream to a temperature of substantially 145° F. which temperature gives the maximum emulsification of the fat in homogenization, homogenizing said cream at a pressure of substantially 1000 pounds, thereby insuring sufficient emulsification of the fat, and thence adding to the skim milk, which has been pasteurized and cooled to approximately 88° F., said pasteurized homogenized cream.

2. A new process for preventing the oiling off or leakage of butterfat in cheese, which comprises separating milk, heating the resulting cream to a temperature of substantially 145° F. which temperature gives the maximum emulsification of the fat in homogenization, homogenizing said cream at a pressure of substantially 1000 pounds, thereby insuring sufficient emulsification of the fat, and adding said pasteurized homogenized cream to pasteurized skim milk.

3. A process for preventing the oiling off or leakage of butterfat in cheese, which comprises separating milk, thence heating the recovered cream to a temperature of substantially 145° F., thereby accomplishing the maximum emulsification of the fat in homogenization, thence homogenizing the cream at a pressure of substantially 1,000 pounds, thence pasteurizing the cream, and thence standardizing the cream with pasteurized skim milk.

HARRY L. WILSON.
WILLIAM T. JOHNSON, Jr.